United States Patent
Williams et al.

(10) Patent No.: US 10,284,548 B2
(45) Date of Patent: May 7, 2019

(54) SYSTEM AND METHOD FOR STRONG REMOTE IDENTITY PROOFING

(75) Inventors: Jeffrey B. Williams, Arlington, VA (US); Allan Camaisa, La Joua, CA (US)

(73) Assignee: Anakam, Inc., San Diego, CA (US)

( * ) Notice: Subject to any disclaimer, the term of this patent is extended or adjusted under 35 U.S.C. 154(b) by 667 days.

(21) Appl. No.: 13/386,546

(22) PCT Filed: Aug. 2, 2010

(86) PCT No.: PCT/US2010/044130
§ 371 (c)(1),
(2), (4) Date: Mar. 30, 2012

(87) PCT Pub. No.: WO2011/014878
PCT Pub. Date: Feb. 3, 2011

(65) Prior Publication Data
US 2012/0191621 A1   Jul. 26, 2012

Related U.S. Application Data

(60) Provisional application No. 61/230,389, filed on Jul. 31, 2009.

(51) Int. Cl.
| | |
|---|---|
| *H04L 29/06* | (2006.01) |
| *G06Q 50/26* | (2012.01) |
| *H04L 9/32* | (2006.01) |
| *H04W 12/06* | (2009.01) |

(52) U.S. Cl.
CPC ....... *H04L 63/0838* (2013.01); *G06Q 50/265* (2013.01); *H04L 63/18* (2013.01); *H04L 2463/082* (2013.01)

(58) Field of Classification Search
USPC .................................. 726/7, 28; 705/44, 76
See application file for complete search history.

(56) References Cited

U.S. PATENT DOCUMENTS

| | | | |
|---|---|---|---|
| 7,904,360 B2 * | 3/2011 | Evans | 705/35 |
| 8,732,089 B1 * | 5/2014 | Fang et al. | 705/67 |
| 2004/0254868 A1 | 12/2004 | Kirkland et al. | |
| 2005/0193208 A1 | 9/2005 | Charrette, III et al. | |
| 2007/0169182 A1 * | 7/2007 | Wolfond et al. | 726/7 |
| 2007/0250920 A1 * | 10/2007 | Lindsay | 726/7 |
| 2007/0266257 A1 | 11/2007 | Camaisa et al. | |
| 2008/0022414 A1 | 1/2008 | Cahn et al. | |
| 2008/0046366 A1 * | 2/2008 | Bemmel et al. | 705/44 |

(Continued)

FOREIGN PATENT DOCUMENTS

| | | |
|---|---|---|
| EP | 444351 | 9/1991 |
| WO | 0144940 | 6/2001 |

(Continued)

OTHER PUBLICATIONS

International Patent Application No. PCT/US2010/044130, "International Search Report" dated Oct. 20, 2010 (2 pages).

(Continued)

*Primary Examiner* — Mark A Fleischer
(74) *Attorney, Agent, or Firm* — Kilpatrick Townsend & Stockton LLP

(57) ABSTRACT

A method and system for strong remote identity proofing.

20 Claims, 2 Drawing Sheets

Overall Process Flow High Confidence Remote Identity Proofing

(56) References Cited

U.S. PATENT DOCUMENTS

2008/0255992 A1* 10/2008 Lin ............................. 705/44
2009/0254572 A1* 10/2009 Redlich et al. ............... 707/10

FOREIGN PATENT DOCUMENTS

WO    2007051090    5/2007
WO    2011014878    2/2011

OTHER PUBLICATIONS

European Patent Application No. 10805176.4, Extended European Search Report dated Apr. 9, 2014, 8 pages.
Trilli et al., Knowledge-Based Authentication. Challenge Response System, retrieved from http://csrc.nist.gov/archive/kba/Presentations/Day 1/Trilli-Andrews.pdf [Mar. 28, 2014], Feb. 9, 2004, 20 pages.
EP10805176.4 , "Office Action", dated Oct. 25, 2018, 5 pages.
Canadian Patent Application No. 2,768,952 , First Office Action, dated Jun. 10, 2016, 3 pages.

* cited by examiner

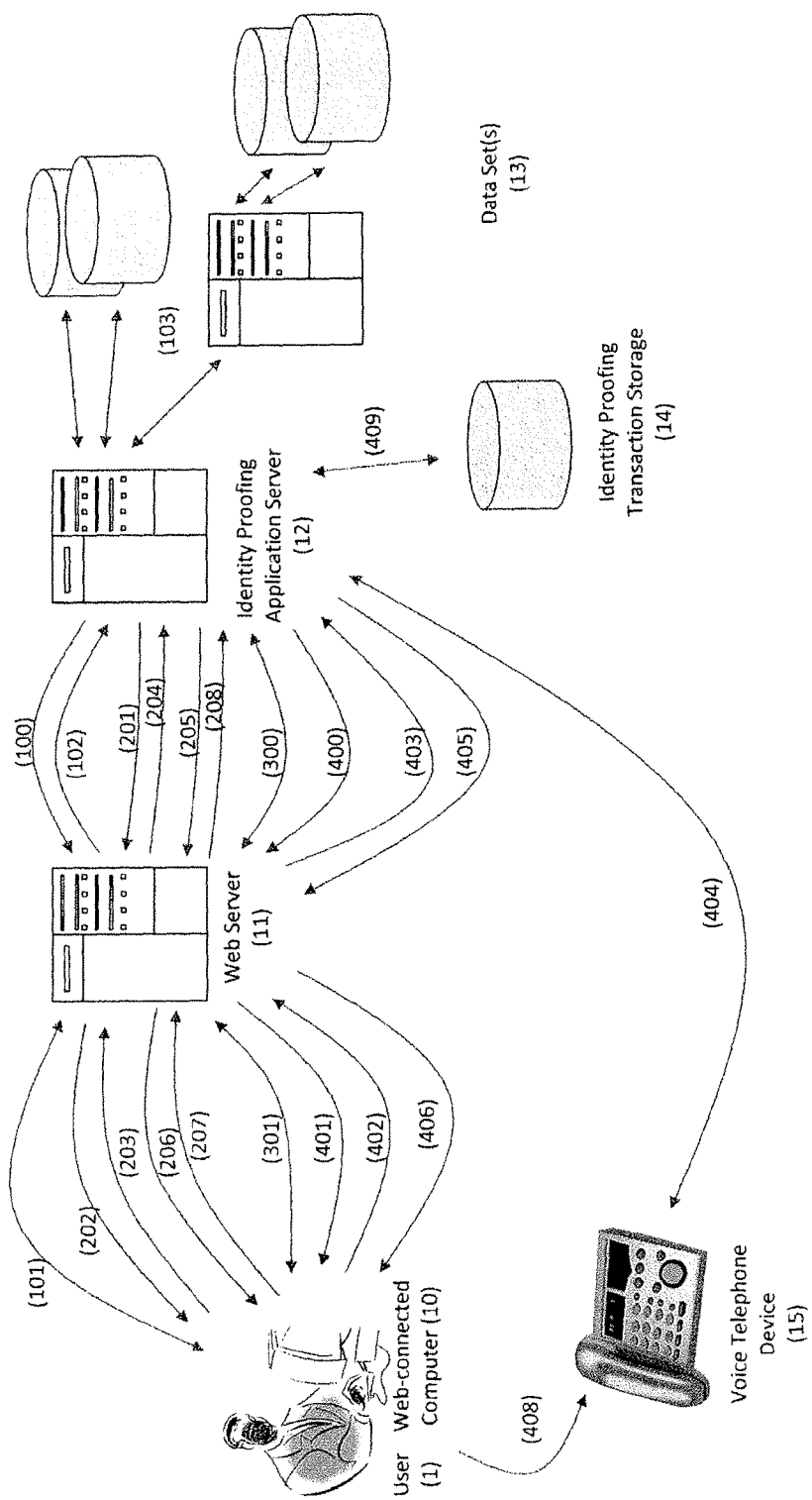
Figure 1 – Overall Process Flow High Confidence Remote Identity Proofing

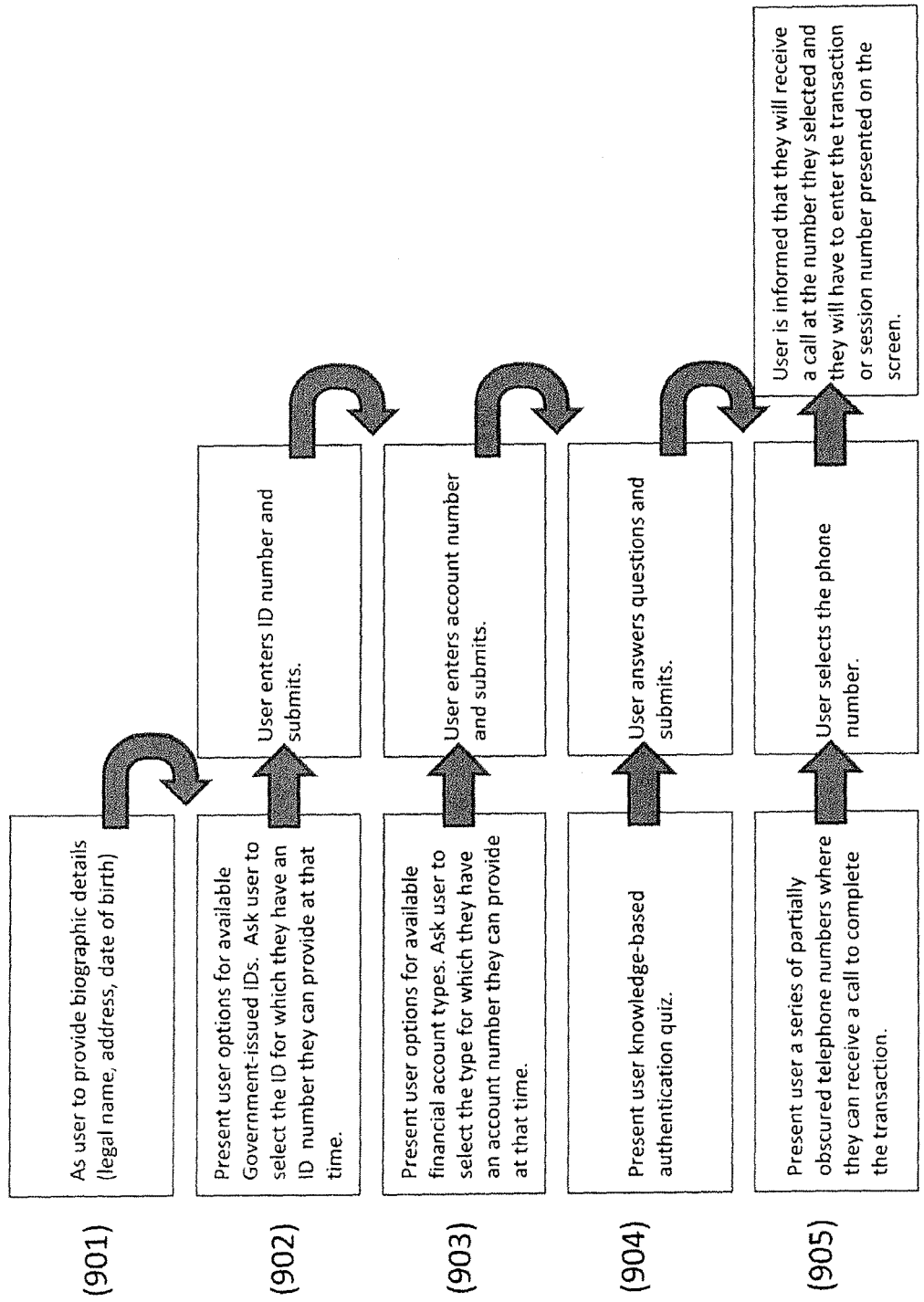
Figure 2 – Graphical User Interface Process Flow

SYSTEM AND METHOD FOR STRONG REMOTE IDENTITY PROOFING

CROSS REFERENCE TO RELATED APPLICATIONS

This application is a U.S. national phase patent application under 35 U.S.C. 371 of International Patent Application No. PCT/US2010/044130 entitled "System and Method for Strong Remote Identity Proofing" filed Aug. 2, 2010, which claims benefit of priority under PCT Article 8 of U.S. Provisional Application No. 61/230,389, titled "System and Method for Strong Remote Identity Proofing" filed on Jul. 31, 2009. Both applications are incorporated herein by reference in their entireties.

BACKGROUND

The present invention relates generally to the systems and methods used to confirm the asserted identity of an individual to a high level of confidence remotely over the Web. The same method can also be used in a face-to-face transaction when the individual asserting their identity has no other identifying information.

Identity proofing extends across multiple levels of risk. Identity proofing is usually the first step in a process associated with issuing credentials to an individual. The credential can be reused over-and-over again as an assertion of the initial identity proofing. The process of using the credential to conduct a transaction is authentication. Further, the risk associated with identity proofing is independent of the risk associated with authentication. As an example, there are some transactions where the user may be anonymous, but the information provided must remain confidential and associated only with that unique user. In such a case, the identity proofing may be weak or non-existent, while the credential and authentication is strong. These identity proofing, credential, and authentication principals apply in both physical and logical contexts.

In the logical context (and in physical too), the identity proofing may be conducted face-to-face, by reference, or by self-assertion. Each of these types of identity proofing can then leverage a series of steps to prove identity and the steps implemented define the rigor and strength of the identity proofing. As an example, face-to-face identity proofing can require a single government-issued picture ID or it could require two plus a verification of address.

In accordance with NIST Special Publication 800-63, the basis of remote identity proofing at a high confidence of the individuals identity is defined as, "Possession of a valid Government ID (e.g. a driver's license or Passport) number and a financial account number (e.g., checking account, savings account, loan or credit card) with confirmation via records of both numbers." This document continues by defining the actions necessary to achieve these actions. NIST Special Publication 800-63 states that the registration authority (RA) first, "Verifies information provided by Applicant including ID number AND account number through record checks either with the applicable agency or institution or through credit bureaus or similar databases, and confirms that: name, [date of birth], address and other personal information in records are consistent with the application and sufficient to identify a unique individual." The RA must also either provide address confirmation by performing either of these actions, "a) Issues credentials in a manner that confirms the address of record supplied by the Applicant; or b) Issues credentials in a manner that confirms the ability of the Applicant to receive telephone communications at a number associated with the Applicant in records, while recording the Applicant's voice or using equivalent alternative means to establish non-repudiation."

Institutions seek a capability to implement the requirements in the NIST standards while also allowing for the remote identity proofing of an individual via a Web transaction such that there is no delay and the user can then immediately conduct transactions with that identity. The process of confirming an account number or government issued identity along with an address confirmation usually requires a delay while performing these process steps. This embodiment describes a method and a process for conducting this above described transaction remotely while doing so such that the transaction can be processed in real-time and allow the subsequent transactions if the identity proofing transaction is successful.

BRIEF SUMMARY OF THE INVENTION

The systems and methods for strong remote identity proofing are disclosed herein. When confirming to a very high level of confidence that the asserted electronic identity is that of the actual individual, the individual conducting the electronic identity proofing shall assert an identity by providing the biographical details of their identity including, but not limited to their legal name, date of birth, and address. The system will query data repositories with the biographical data provided. These data repositories include, but are not limited to, existing enterprise records, public data sources, vendors who aggregate public data, and credit bureaus. This embodiment provides the method for meeting the three key process steps 1) validating the government issued identity, 2) validating the account number, and 3) confirming the address supplied in the records in real time. Additionally, this embodiment provides for additional knowledge-based questions from the data gathering process to be presented to further confirm the identity.

The present embodiment gathers variable amounts and qualities of data on the individual. Once gathered it then determines if it is capable of conducting the identity proofing based upon the data available. If so, it combines a set of graphical user interfaces as well as questions and answers to facilitate real-time implementation of this standard.

The methods and systems disclosed herein can be used for any identity proofing in which high confidence that the asserted is the actual identity of the end-user is required. This includes, but is not limited to, electronic government, healthcare, banking, and commercial transactions performed on a network infrastructure including the WWW. The details of the present invention, both as to its structure and operation, can best be understood in reference to the accompanying drawings, in which like reference numerals refer to like parts, and in which:

BRIEF DESCRIPTION OF THE DRAWINGS

FIG. 1 shows the overall general process flow for conducting remote high confidence identity proofing.

FIG. 2 shows and the detail behind graphical user interface system process flow for the user.

DETAILED DESCRIPTION OF THE DRAWINGS AND THE PRESENTLY PREFERRED EMBODIMENTS

Unless otherwise specified, all figure references in this document refer to FIG. 1. A user (1) using a Web connected computer (10) connects to a system through a Web server (11) that requires identity proofing. The identity proofing server (12) presents a request (100) to the Web server to display a page requesting the user to provide the credentials. The Web server displays this page at (101) [Detail can be found on FIG. 2 sequence (901)]. The user (1) at (101) asserts their own identity by providing biographical information to a system soliciting such from the registrant. This information minimally includes legal name and address at a minimum, but can optionally require date of birth, Social Security Number, or some other enterprise specific identifier that supports identity resolution. The information is passed from the Web server back to the identity proofing server at (102). The identity proofing server (12) queries (103) one or more data sets attempting to find the unique individual associated with the biometric information and assembles all available government issued identity information, all financial accounts numbers and institutions (including, but not limited to, credit cards, mortgages, loans, checking, and savings), and any and all telephone numbers associated with the individual. If insufficient data is available, the enterprise can either make the decision to proceed with the identity proofing, omitting the steps that are not valid since data is not available or sufficient, or the enterprise can decide to refer the individual to an alternate process which might include stopping the remote identity proofing and forcing a face-to-face or delayed transaction.

The identity proofing server reviews the government issued ID numbers it has on record and presents a graphical user interface through the Web server at (201) and (202) that provides the user a selection of types of Government IDs it can validate for that user in a radio button, drop-down list, or similar format. This list would be comprised of those it has on record and would eliminate as invalid those IDs or licenses that the enterprise considers inappropriate for this use. This list would show items such as state driver license, state identity card, military ID card, hunting license, pilot's license, medical license, etc, but only those it has on the individual.

The user (1) would select one of the IDs for which they would be able to provide a number, or they would select that they do not have any of the identities on the list. The user would then be presented a screen where they would be requested to provide the number for the particular ID and the user will type that data into the screen and submit this data where it is returned to the Web server and then the identity proofing server by (203) and (204). [Detailed graphical user interface flow for this and the prior paragraph are shown in FIG. 2 (902)]

The identity proofing server reviews the financial account numbers it has on record and presents a graphical user interface through the Web server at (205) and (206) that provides the user a selection of types of financial accounts it can validate for that user in a radio button, drop-down list, or similar format. This list would be comprised of those it has on record and would eliminate as invalid those financial accounts that the enterprise considers inappropriate for this use. This list would show items such as credit card, debit card, mortgage, checking, savings, car loan, line of credit, etc, but only those it has on the individual.

The user (1) would select one of the account types for which they would be able to provide a number, or they would select that they do not have any of the identities on the list. The user would then be presented a screen where they would be requested to provide the number for the particular account and the user will type that data into the screen and submit this data where it is returned to the Web server and then the identity proofing server by (207) and (208). It is important to note that a user might have three credit cards. If multiple accounts occur within and account type, the user would select the account type and enter the accounts and the system would compare against multiple numbers, not just a single number. [Detailed graphical user interface flow for this and the prior paragraph are shown in FIG. 2 (903)]

If there is an error in the validation process, the system and method allows the enterprise to define whether or not the user is presented with error handling after each submission (government issued-ID or bank account) or after both submissions (government issued-ID and bank account).

The system and method then optionally allows the presentation of a series of out-of-wallet questions to the end-user using knowledge-based authentication at (300) and (301). The knowledge-based authentication can be an augmentation to, or a replacement for, the provision of a government issued ID and the provision of a financial account number. The presentation format (series versus parallel), number of questions, the balance of the data sources for those questions, the existence of dummy ("none of the above") answers in the data set, and the allowable timing to complete the questions are completely controlled by the enterprise. The end-user submits their answers. The test is scored and the score of the test is weighed in the evaluation of the overall test success. [A summary of this graphical user interface flow for this is shown in FIG. 2 (904)]

In order to perform address confirmation and non-repudiation thereof, the identity proofing server at (400) and (401) then presents the user one or more partial phone numbers gathered from the external the query and asks the user to select one of the partial phone numbers as one at which they can receive a phone call. Partial phone numbers include those with less significant digits obscured or replaced by symbols to prevent them from being called yet still identifying them as unique to the individual. The phone number may be home phones, office phones, or mobile phone numbers based upon the availability of data on the individual. One or more of the partial phone numbers in the list may be dummy numbers that are known not to belong to the individual. The user (1) selects the best number at which to reach their voice telephone device (15) and submits this data to the identity proofing server via the Web server at (402) and (403).

The identity proofing server at (404) places a call to the individual at the number they selected. At the same time, the identity proofing server also presents a transaction number, session number, or other random number via the Web server at (405) and (406). During this call session at (404), the person answering the phone is informed that the call is part of an identity proofing call and that they must enter the identity proofing transaction number provided at (406). This number can be entered by DTMF or by voice recognition of the spoken code into the user's voice telephone device (15) at (408). The user is then asked to state a phrase that the user (1) repeats into the phone at (408) is recorded by returning it to the identity proofing server on (404) and stored in a identity proofing transaction repository (14) such that it can be used later for non-repudiation of the identity proofing transaction, [Detailed graphical user interface flow for this and the prior paragraph are shown in FIG. 2 (905)]

If the user selects an incorrect number this should be considered as part of the identity proofing question and answer process as a false answer and weighed accordingly when evaluating the risk that an imposter is conducting the transaction. If the user selects a correct number but fails to answer, then they can be offered the ability to try again at the same number or an alternate number.

The identity proofing system then presents the results for scoring against enterprise rules to determine if the asserted identity will be trusted. Optionally, the enterprise may vary the level of risk associated with the identity of the user based upon their performance on the identity proofing process. This now proofed identity is handed off to the next step in the enterprise process which can include a transaction or registration for a credentialing and authentication system.

While the particular Systems and Methods for Strong Remote Identity Proofing as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A method of real-time remote identity proofing a user, the method comprising:
   querying, by a network device, data sets, wherein the network device queries the data sets using biographic data received through a web interface from the user located remotely from the network device;
   assembling, based on at least one result received in response to querying the data sets, information associated with government-issued identification cards associated with the user, information associated with financial accounts associated with the user, and telephone numbers associated with the user;
   generating, by the network device, a list of types of the government-issued identification cards associated with the user and a government-issued identification card interface for receiving a number for a government-issued identification card that is the same type as the type selected by the user from the list of the types of the government-issued identification cards associated with the user;
   generating, by the network device, a list of types of the financial accounts associated with the user and a financial accounts interface for receiving a number for a financial account that is the same type as the type selected by the user from the list of the types of the financial accounts associated with the user;
   generating, by the network device, a list of partially-obscured telephone numbers that includes at least one partially-obscured telephone number corresponding to a telephone number associated with the user and at least one dummy partially-obscured telephone number that does not correspond to any telephone numbers associated with the user; and
   responsive to receiving via a network a selection by the user of the at least one partially-obscured telephone number,
   (i) placing, by the network device, a call to the user at the telephone number associated with the user and corresponding to the at least one partially-obscured telephone number;
   (ii) generating, by the network device, an interface that includes an identity-proofing transaction number for the user; and
   (iii) transmitting, by the network device, a prompt to the user to enter the identity-proofing transaction number from the user via a telephone network.

2. The method of claim 1, further comprising presenting to the user via the web interface an out-of-wallet question to perform a knowledge-based authentication by receiving a correct answer to the out-of-wallet question.

3. The method of claim 2, wherein the out-of-wallet question includes selectable answers that include at least one dummy answer.

4. The method of claim 1 wherein said identify-proofing transaction number is a phrase.

5. The method of claim 1 wherein the identify-proofing transaction number is voice-identified.

6. The method of claim 1 further comprising the step of presenting the results for scoring against enterprise rules for determination of the user's identity.

7. The method of claim 1, further comprising generating, by the network device, an interface having the list of partially-obscured telephone numbers and configured for receiving the selection, wherein the selection is made via the interface subsequent to the network device providing access to the interface by the user.

8. A system for real time remote identify proofing a user, comprising:
   an identity proofing server device connectable to a network and containing instructions that are executable by a processor device for:
   querying data sets that are remotely stored over the network to assemble (i) information associated with government-issued identification cards associated with the user, (ii) information associated with financial accounts associated with the user, and (iii) telephone numbers associated with the user, wherein the processor device is configured by the instructions to perform the querying using biographic data received through a web interface from the user located remotely from the network device;
   generating a list of types of the government-issued identification cards associated with the user and a government-issued identification card interface for receiving a number for a government-issued identification card that is the same type as the type selected by the user from the list of the types of the government-issued identification cards associated with the user;
   generating a list of types of the financial accounts associated with the user and a financial accounts interface for receiving a number for a financial account that is the same type as the type selected by the user from the list of the types of the financial accounts associated with the user;
   generating a list of partially-obscured telephone numbers that includes at least one partially-obscured telephone number corresponding to a telephone number associated with the user and at least one dummy partially-obscured telephone number that does not correspond to any telephone numbers associated with the user; and in response to receiving via the network a selection by the user of the at least one partially-obscured telephone number,
  (i) placing a call to the user at the telephone number associated with the user and corresponding to the at least one partially-obscured telephone number;
  (ii) generating an interface that includes an identity-proofing transaction number for the user; and
  (iii) transmitting a prompt to the user to enter the identity-proofing transaction number from the user via a telephone network.

9. The system of claim 8, wherein the biographic data includes a date of birth of the user.

10. The system of claim 8, wherein the biographic data includes a social security number of the user.

11. The system of claim 8, wherein the identity proofing server is configured for presenting to the user via the web interface an out-of-wallet question to perform a knowledge-based authentication by receiving a correct answer to the out-of-wallet question, wherein the out-of-wallet question includes selectable answers that include at least one dummy answer.

12. The system of claim 8, wherein the identity-proofing server is connected to an identity proofing transaction storage server by the network.

13. The system of claim 8, wherein the government-issued identification cards include military identification cards.

14. The system of claim 8, wherein the government-issued identification cards include medical licenses.

15. An information system for real time remote identify proofing a user in an electronic network, comprising:
  a computer;
  a web server;
  said computer connected to said network via said web server;
  an identity proofing server connected to said network;
  data sources connected to the network, the data sources containing data sets of the user to be identity-proofed, data sets associated with government issued identification cards, data sets associated with financial accounts, and data sets associated with telephone numbers of the user to be identity-proofed; and
  a telephone associated with the user to be identity-proofed,
  wherein the identity proofing server contains instructions that are executable by a processor device for:
    querying the data sets that are remotely stored over the network to assemble (i) information associated with government-issued identification cards associated with the user, (ii) information associated with financial accounts associated with the user, and (iii) the telephone numbers, wherein the processor device is configured by the instructions to perform the querying using biographic data received from the user through the network and a web interface;
    generating a list of types of the government-issued identification cards associated with the user and a government-issued identification card interface for receiving a number for a government-issued identification card that is the same type as the type selected by the user from the list of the types of the government-issued identification cards associated with the user;
    generating a list of types of the financial accounts associated with the user and a financial accounts interface for receiving a number for a financial account that is the same type as the type selected by the user from the list of the types of the financial accounts associated with the user;
    generating a list of partially-obscured telephone numbers that includes at least one partially-obscured telephone number corresponding to a telephone number associated with the user and at least one dummy partially-obscured telephone number that does not correspond to any telephone number associated with the user; and
    in response to receiving via the network a selection by the user of the at least one partially-obscured telephone number corresponding to the telephone,
      (i) placing a call to the telephone;
      (ii) generating an interface that includes an identity-proofing transaction number for the user; and
      (iii) transmitting a prompt to the user to enter the identity-proofing transaction number from the user via a telephone network.

16. The system of claim 15, wherein the biographic data includes name of the user.

17. The system of claim 15, wherein the biographic data includes a date of birth of the user.

18. The system of claim 15, wherein the biographic data includes a social security number of the user.

19. The system of claim 15, further comprising second data for knowledge-based authentication, said second data available to said network.

20. The system of claim 19 wherein said second data includes dummy questions.

* * * * *